United States Patent
Chiang et al.

(10) Patent No.: US 11,610,155 B2
(45) Date of Patent: Mar. 21, 2023

(54) DATA PROCESSING SYSTEM AND DATA PROCESSING METHOD

(71) Applicant: Quanta Computer Inc., Taoyuan (TW)

(72) Inventors: Chia-Chen Chiang, Taoyuan (TW);
Meng-Yu Li, Taoyuan (TW);
Chun-Hung Chen, Taoyuan (TW);
Chen-Chung Lee, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 332 days.

(21) Appl. No.: 16/984,354

(22) Filed: Aug. 4, 2020

(65) Prior Publication Data

US 2021/0304068 A1    Sep. 30, 2021

(30) Foreign Application Priority Data

Mar. 24, 2020  (TW) .................................. 109109722

(51) Int. Cl.
*G06G 7/00* (2006.01)
*G06N 20/00* (2019.01)
*G06F 3/06* (2006.01)

(52) U.S. Cl.
CPC ........... *G06N 20/00* (2019.01); *G06F 3/0604* (2013.01); *G06F 3/0638* (2013.01); *G06F 3/0673* (2013.01)

(58) Field of Classification Search
CPC ............ G06N 20/00; G06N 3/04; G06N 3/08; G06N 3/0454; G06F 3/0604; G06F 3/0638; G06F 3/0673
USPC ............................................. 706/12, 15, 25
See application file for complete search history.

(56) References Cited

U.S. PATENT DOCUMENTS

| | | | | |
|---|---|---|---|---|
| 9,514,404 B1* | 12/2016 | Corrado | ................. | G06N 3/084 |
| 10,679,124 B1* | 6/2020 | Corrado | ................. | G06F 17/16 |
| 2018/0150724 A1* | 5/2018 | Brock | .................... | G06K 9/622 |
| 2018/0284752 A1* | 10/2018 | Celia | ...................... | G06N 3/006 |
| 2019/0265713 A1* | 8/2019 | Zhou | ...................... | B60W 30/16 |
| 2020/0218275 A1* | 7/2020 | Zhou | .................... | G05D 1/0223 |
| 2020/0242642 A1* | 7/2020 | Thimsen | ................. | G06F 16/36 |

(Continued)

FOREIGN PATENT DOCUMENTS

TW          I639091 B       10/2018

OTHER PUBLICATIONS

Chinese language office action dated Oct. 30, 2020, issued in application No. TW 109109722.

*Primary Examiner* — Thuy N Pardo

(74) *Attorney, Agent, or Firm* — McClure, Qualey & Rodack, LLP

(57) ABSTRACT

A data processing method includes the following steps: generating a machine-learning parameter and obtaining a storage parameter code, wherein the storage parameter code corresponds to a storage space; receiving the machine-learning parameter and the storage parameter code, and storing the machine-learning parameter in the storage space according to the storage parameter code, and generating an event notification when the machine-learning parameter is modified; and generating a loading request according to the event notification, and the loading request is used to request the modified machine-learning parameter, wherein after the loading request is generated, the modified machine-learning parameter is downloaded from the storage space corresponding to the storage parameter code.

10 Claims, 3 Drawing Sheets

(56) References Cited

U.S. PATENT DOCUMENTS

| | | | |
|---|---|---|---|
| 2020/0273548 A1* | 8/2020 | Wolf | A61B 34/25 |
| 2020/0371778 A1* | 11/2020 | Ni | G06F 8/70 |
| 2021/0192321 A1* | 6/2021 | Zhang | G06N 3/0445 |
| 2022/0121427 A1* | 4/2022 | Evangelopoulos | G06F 8/40 |

* cited by examiner

200

```
┌─────────────────────────────────────┐
│  Generating a machine-learning       │
│  parameter and obtaining a storage   │
│  parameter code, and the storage     │──210
│  parameter code corresponds to a     │
│  storage space                       │
└─────────────────────────────────────┘
                  ↓
┌─────────────────────────────────────┐
│  Receiving the machine-learning      │
│  parameter and the storage parameter │
│  code and storing the machine-       │
│  learning parameter in the storage   │──220
│  space according to the storage      │
│  parameter code; transmitting an     │
│  event notification when the         │
│  machine-learning parameter is       │
│  modified                            │
└─────────────────────────────────────┘
                  ↓
┌─────────────────────────────────────┐
│  Receiving the event notification,   │
│  and transmitting a loading request  │
│  according to the event notification │
│  to request the modified machine-    │
│  learning parameter; after receiving │──230
│  the loading request, downloading    │
│  the modified machine-learning       │
│  parameter from the storage space    │
│  corresponding to the parameter      │
│  storage code                        │
└─────────────────────────────────────┘
```

FIG. 2

DATA PROCESSING SYSTEM AND DATA PROCESSING METHOD

CROSS REFERENCE TO RELATED APPLICATIONS

This application claims priority of Taiwan Patent Application No. 109109722, filed on Mar. 24, 2020, the entirety of which is incorporated by reference herein.

BACKGROUND OF THE INVENTION

Field of the Invention

The present disclosure relates to a processing system and, in particular, to a data processing system and a data processing method.

Description of the Related Art

Generally speaking, after the training stage of machine-learning is completed, the developer needs to manually export the parameters and place those parameters in a location that can be accessed by the prediction data processing program. Therefore, the parameters can load the machine-learning parameters into the machine-learning model. When the parameters change, it needs to manually export the new parameters again and stop the prediction data processing program manually and then reload the new parameters to process a subsequent data prediction. This process can be quite inconvenient when designing a system for machine-learning prediction.

Therefore, how to simplify the processing flow of machine-learning prediction to quickly and accurately process updated or adjusted parameters has become one of the problems to be solved in this field.

BRIEF SUMMARY OF THE INVENTION

In accordance with one feature of the present invention, the present disclosure provides a data processing system. The data processing system comprises a storage device, a machine-learning training module, a machine-learning parameter storage module and a prediction data processing module. The storage device is configured to provide a storage space. The machine-learning training module is configured to generate a machine-learning parameter and obtain a storage parameter code. The storage parameter code corresponds to the storage space. The machine-learning parameter storage module is configured to receive the machine-learning parameter and the storage parameter code, and store the machine-learning parameter in the storage space according to the storage parameter code. When the machine-learning parameter is modified, the machine-learning parameter storage module sends an event notification. The prediction data processing module is configured to receive the event notification and transmit a loading request according to the event notification to request the modified machine-learning parameter from the machine-learning parameter storage module. After receiving the loading request, the machine-learning parameter storage module downloads the modified machine-learning parameter from the storage space corresponding to the storage parameter code, the machine-learning parameter storage module transmits the modified machine-learning parameter to the prediction data processing module.

In accordance with one feature of the present invention, the present disclosure provides a data processing method. The data processing method includes the following steps: generating a machine-learning parameter and obtaining a storage parameter code, wherein the storage parameter code corresponds to a storage space; receiving the machine-learning parameter and the storage parameter code, and storing the machine-learning parameter in the storage space according to the storage parameter code, and generating an event notification when the machine-learning parameter is modified; and generating a loading request according to the event notification, and the loading request is used to request the modified machine-learning parameter, wherein after the loading request is generated, the modified machine-learning parameter is downloaded from the storage space corresponding to the storage parameter code.

Based on the description above, by using the data processing system and data processing method, the prediction data processing module and the machine-learning parameter storage module can know the storage space corresponding to the machine-learning parameter by sharing the storage parameter code. After the machine-learning parameter is modified, through the mechanism of event notification, the prediction data processing module reloads the new or modified machine-learning parameter to update the machine-learning parameter used to predict the new data of machine-learning parameter. Even if the machine-learning parameter are updated frequently, the latest version of the machine-learning parameter can be automatically stored and loaded, so that the prediction data processing module uses the latest version of the machine-learning parameter in subsequent applications. Therefore, the data processing system and data processing method of the case can achieve the effect of simplifying the processing flow of machine-learning prediction.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which:

FIG. 2 is a flowchart of a data processing method in accordance with one embodiment of the present disclosure.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
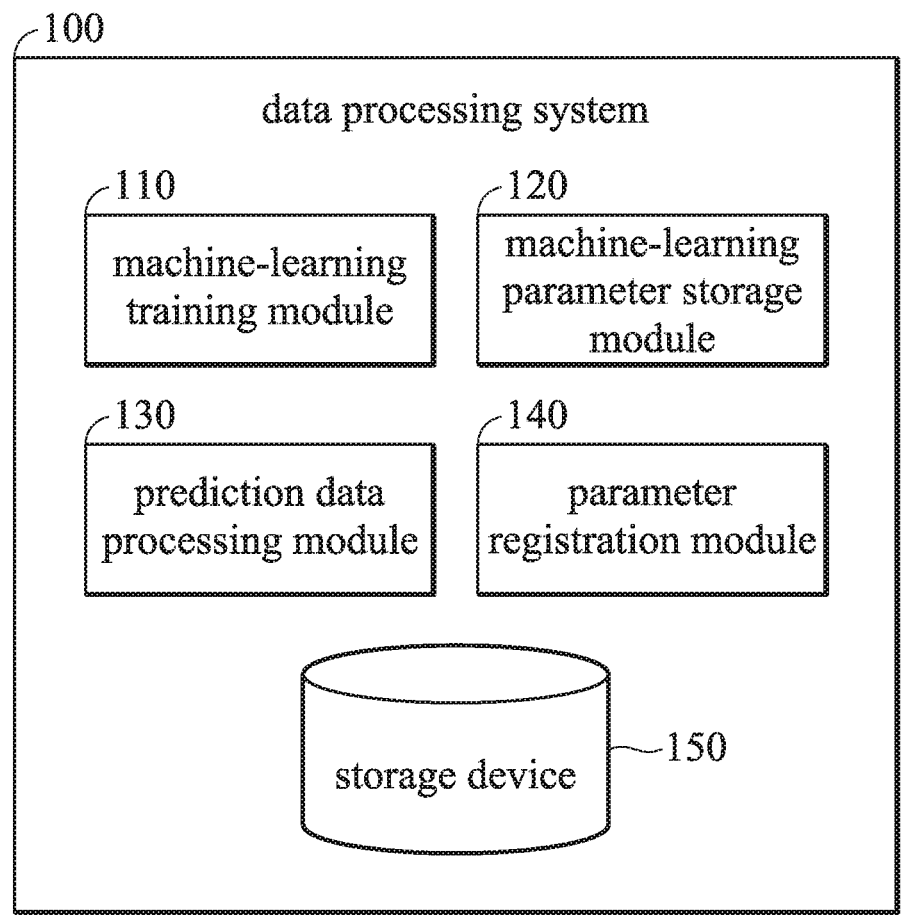
FIG. 1 is a block diagram of a data processing system in accordance with one embodiment of the present disclosure.

Please refer to FIGS. 1 and 2. FIG. 1 is a block diagram of a data processing system 100 in accordance with one embodiment of the present disclosure. FIG. 2 is a flowchart of a data processing method 200 in accordance with one embodiment of the present disclosure.

As shown in FIG. 1, the data processing system 100 is suitable for use on an electronic device. The electronic device is, for example, a computer, a mobile phone, a tablet, or other devices with computing functions. In one embodiment, the data processing system 100 includes a machine-learning training module 110, a machine-learning parameter storage module 120, a prediction data processing module 130, and a storage device 150. In one embodiment, the data processing system 100 includes a parameter registration module 140.

In one embodiment, the storage device 150 can be implemented as a read-only memory, a flash memory, a floppy disk, a hard disk, a compact disk, a flash drive, a tape, a network accessible database, or as a storage medium that can be easily considered by those skilled in the art to have the same function.

In an embodiment, a machine-learning training module 110, a machine-learning parameter storage module 120, a prediction data processing module 130, and a parameter registration module 140 can each or together be implemented by integrated circuit such as a micro controller, a microprocessor, a digital signal processor, an application specific integrated circuit (ASIC), or a logic circuit.

In one embodiment, the machine-learning training module 110, the machine-learning parameter storage module 120, the prediction data processing module 130, and the parameter registration module 140 may be implemented by a container virtualization technology. Container virtualization technology belongs to the operating system layer virtualization. It mainly relies on the support of the kernel virtualization of the operating system, so that each one of multiple user-space instances located in the kernel of the host operating system runs independently. The resource space of each load user space column item is called a container, and the host kernel itself also has management functions to make each container run in isolation and minimize the interaction between each container. Therefore, the computing, storage, memory, network, and other resources used by the programs executed in each container are as if they were individually dedicated. In one embodiment, the machine-learning training module 110, the machine-learning parameter storage module 120, the prediction data processing module 130, and the parameter registration module 140 are composed of one or more containers (each container can be used to execute a specific program). The application of container virtualization technology belongs to known technologies, such as the known Docker container technology and CoreOS rkt (Rocket) container technology. These known technologies are an implementation of the present invention, so they are not further described herein.

In step 210, the machine-learning training module 110 generates a machine-learning parameter and obtains a storage parameter code, and the storage parameter code corresponds to a storage space.

In one embodiment, the machine-learning training module 110 can include a neural network model, such as a Convolutional Neural Network (CNN), a Recurrent Neural Network (RNN), a Generative Adversarial Network (RNN), and Generative Adversarial Network (GAN) . . . and so on, neural network models can be implemented using known models.

In one embodiment, by inputting a large amount of historical data (or training data) into the machine-learning training module 110, the machine-learning training module 110 calculates machine-learning parameter through a neural network model. Machine-learning parameter can include parameter(s) such as the number of hidden layers, hundreds of parameters for each layer, the number of running history data, the learning speed, and so on.

In one embodiment, the machine-learning parameter is a data parameter model.

For example, if the user wants to analyze the historical stock price data of a certain stock, the amount of historical data of this stock price is huge, and it is difficult to manually calculate an accurate stock parameter model. Therefore, the historical data of the stock price of this stock is input into the machine-learning training module 110. The neural network model in the machine-learning training module 110 is trained with a large amount of historical stock price data to output machine-learning parameter(s) about this stock price. Machine-learning parameter(s) can be viewed as a stock prediction model or stored as a file. Machine-learning parameter(s) can be used to predict the stock price of this stock at certain point in the future. In one embodiment, the machine-learning training module 110 can obtain the stock price historical data of the stock by downloading from a web page, a folder, or other input methods.

In one embodiment, the parameter registration module 140 starts the registration process after receiving the machine-learning parameter sent by the machine-learning training module 110 for the first time, and generates a storage parameter code corresponding to the machine-learning parameter. In other words, the parameter registration module 140 binds this machine-learning parameter to the storage parameter code. In one embodiment, the parameter registration module 140 can generate a storage parameter code in random numbers, or generate a storage parameter code according to the receiving order (for example, the first set of machine-learning parameter received corresponds to a storage parameter code of 1, and the second set of machine-learning parameter received corresponds to a storage parameter code of 2).

Figure 3:
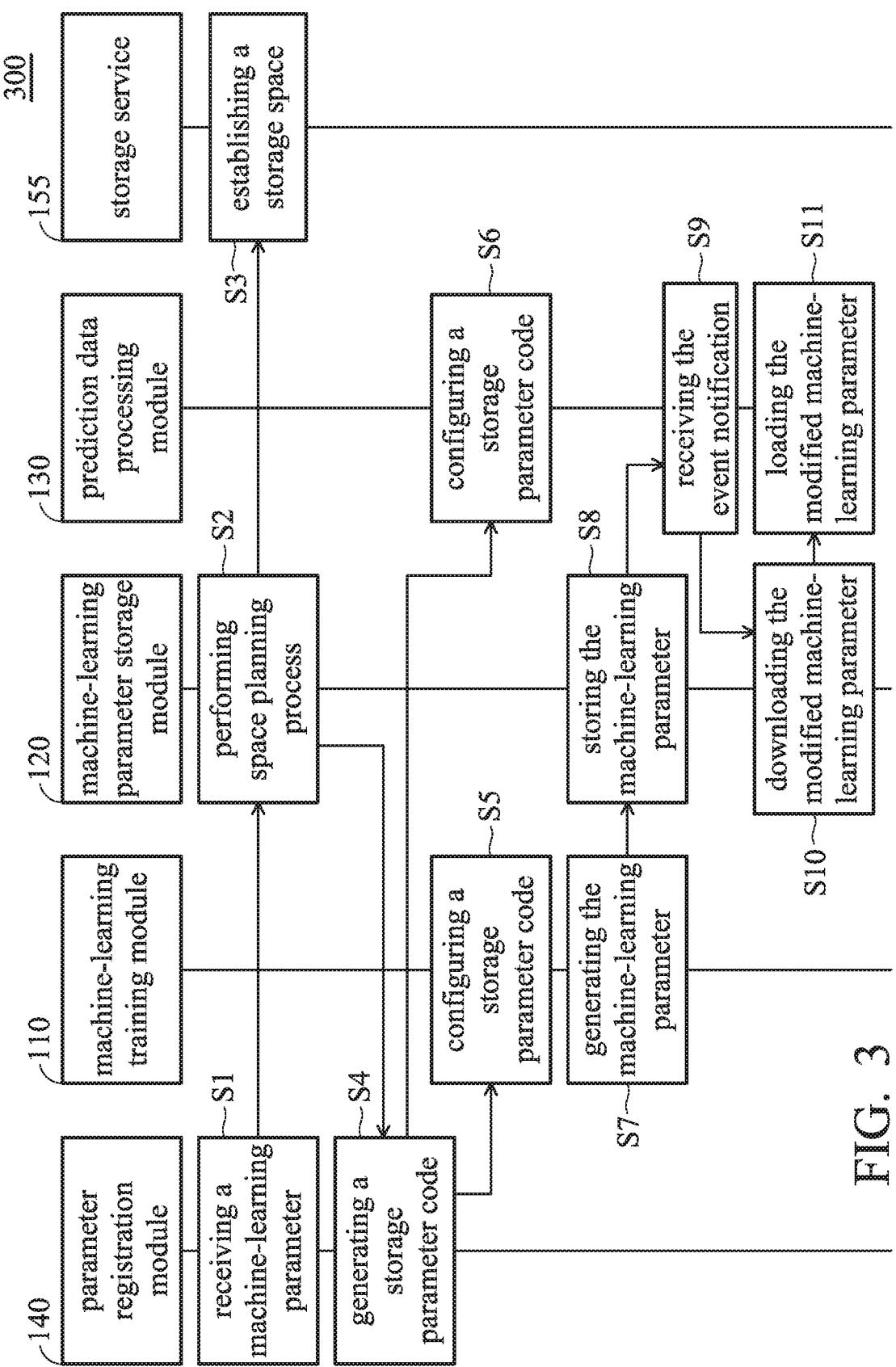
FIG. 3 is a schematic diagram of a data processing method in accordance with one embodiment of the present disclosure.

In one embodiment, after receiving the machine-learning parameter, the parameter registration module 140 sends a space-planning request to the machine-learning parameter storage module 120, so that the machine-learning parameter storage module 120 arranges a storage space for storing the machine-learning parameter. After receiving the space-planning request, the machine-learning parameter storage module 120 triggers a storage service 155 (as shown in FIG. 3)

to establish a storage space, and the parameter registration module 140 maps the storage parameter code to the storage space.

In one embodiment, the parameter registration module 140 generates a correspondence between the storage space and the parameter storage code, and the parameter registration module 140 transmits the storage parameter code to the machine-learning training module 110 and the prediction data processing module 130.

In one embodiment, after receiving the space-planning request, the machine-learning parameter storage module 120 triggers a storage service 155 to call an Application Programming Interface (API) of Kubernetes to request a Persistent Volume Claim (PVC). A Persistent Volume (PV) resource is dynamically deployed through PVC, and this PV resource is used as storage space. Kubernetes is an open source system for automatically deploying, expanding, and managing containerized applications. It provides a platform for automatic deployment, expansion, and running of application containers across host clusters. It can dynamically create storage space and allow machine-learning parameter having a storage location, there is no need to set the location in advance. PV resource(s) in Kubernetes can be used to manage persistent and available storage space in a cluster. PV resource(s) can also be used with other types of storage space such as Network File System (NFS). The life cycle of PV resource is hosted by Kubernetes. PV resource(s) can be dynamically deployed. Users do not need to manually create and delete auxiliary storage. The PVC in Kubernetes is a request and requirement for PV resources. The PVC object requests a specific size, access mode, and configuration file for the PV resource. If a PV resource that meets the request exists or is available for deployment, the PVC is bound to the PV resource. Since Kubernetes is a known technology, it will not be further described here.

In one embodiment, the storage service 155 can create storage space through Kubernetes, Drive, or other known methods.

In step 220, the machine-learning parameter storage module 120 receives the machine-learning parameter and the storage parameter code and stores the machine-learning parameter in the storage space according to the storage parameter code, when the machine-learning parameter is modified, the machine-learning parameter storage module 120 transmits an event notification.

In one embodiment, the machine-learning parameter storage module 120 compares machine-learning parameter corresponding to the same parameter storage code. For example, the machine-learning parameter storage module 120 firstly receives the first version of the machine-learning parameter, and then receives the second version of the machine-learning parameter (for example, the machine-learning parameter storage module 120 collects more stock price historical data to generate more accurate machine-learning parameter). The machine-learning parameter storage module 120 compares whether the first version of the machine-learning parameter and the second version of the machine-learning parameter are the same. If they are different, it means that the second version of the machine-learning parameter has been modified (updated, adjusted or abnormal are considered as being equivalent to modified). The machine-learning parameter storage module 120 sends an event notification to the prediction data processing module 130.

In step 230, the prediction data processing module 130 receives the event notification, and transmits a loading request according to the event notification to request the modified machine-learning parameter from the machine-learning parameter storage module 120, after receiving the loading request, the machine-learning parameter storage module 120 downloads the modified machine-learning parameter from the storage space corresponding to the parameter storage code, and transmits the modified machine-learning parameter to the prediction data processing module 130.

In one embodiment, the prediction data processing module 130 generates a loading request according to the event notification, and transmits the loading request to the machine-learning parameter storage module 120. The loading request is used to request the machine-learning parameter storage module 120 to download the modified machine-learning parameter.

In one embodiment, the prediction data processing module 130 obtains the modified machine-learning parameter for other applications. For example, the new data is analyzed or calculated through the modified machine-learning parameter to obtain more accurate prediction results.

In this way, the prediction data processing module 130 and the machine-learning parameter storage module 120 can know the storage space corresponding to the machine-learning parameter by sharing the storage parameter code, and after the machine-learning parameter are modified, the prediction data processing module 130 is reloaded with new or modified machine-learning parameter after the modified through an event notification mechanism to update the machine-learning parameter used to predict new data.

FIG. 3 is a schematic diagram of a data processing method 300 in accordance with one embodiment of the present disclosure.

In step S1, the parameter registration module 140 receives a machine-learning parameter. In one embodiment, after the parameter registration module 140 receives the machine-learning parameter, the parameter registration module 140 transmits a space-planning request to the machine-learning parameter storage module 120.

In step S2, the machine-learning parameter storage module 120 performs a space-planning process according to the space-planning request, and transmits a storage space creation message to a storage service 155. In one embodiment, after receiving the space-planning request, the machine-learning parameter storage module 120 transmits a storage space creation message to trigger the storage service 155 to establish a storage space.

In step S3, the storage service 155 establishes a storage space.

In one embodiment, steps S3 and S4 may be performed sequentially, simultaneously or out of order after step S2.

In step S4, the parameter registration module 140 generates a storage parameter code.

In one embodiment, the parameter registration module 140 generates a correspondence between the storage space and the storage parameter code, and transmits the storage parameter code to the machine-learning training module 110 and the prediction data processing module 130.

In step S5, the machine-learning training module 110 configures a storage parameter code.

In step S6, the prediction data processing module 130 configures a storage parameter code.

In one embodiment, steps S3 and S4 can be performed sequentially, simultaneously or out of order after step S4. After executing steps S5 to S6, the correspondence between the storage parameter code and the storage space is set according to the machine-learning parameter. In an embodiment, steps S1 to S6 can be regarded as the initial environment settings of the data processing system 100.

In step S7, the machine-learning training module 110 generates the machine-learning parameter.

In step S8, the machine-learning parameter storage module 120 stores the machine-learning parameter in a corresponding storage space.

In one embodiment, the content of the machine-learning parameter (for example, called the first version of the machine-learning parameter) in step S1 and the machine-learning parameter (for example, called the second version of the machine-learning parameter) can be the same or different. Therefore, in step S8, the machine-learning parameter storage module 120 receives the machine-learning parameter (that is, the second version of the machine-learning parameter) and its storage parameter code. When the machine-learning parameter storage module 120 compares the first version of the machine-learning parameter with the second version of the machine-learning parameter corresponding to the same parameter storage code, the machine-learning parameter storage module 120 further compares whether the first version of the machine-learning parameter and the second version of the machine-learning parameter are the same. If they are different, it is determined that the second version of the machine-learning parameter have been modified. And, the machine-learning parameter storage module 120 regards the second version of the machine-learning parameter as the modified machine-learning parameter. The machine-learning parameter storage module 120 transmits an event notification (including modified information) to the prediction data processing module 130, and stores the second version of the machine-learning parameter in the corresponding storage space (it can be the second version of the machine-learning parameter covering the first version of the machine-learning parameter, or when the storage space is sufficient, the second version of the machine-learning parameter and the first version of the machine-learning parameter are stored in the storage space).

If the machine-learning parameter storage module 120 compares the first version of the machine-learning parameter with the second version of the machine-learning parameter, the second version of the machine-learning parameter will be stored in the corresponding storage space (which may cover the first version of the machine-learning parameter, or when the storage space is sufficient, the second version of the machine-learning parameter and the first version of the machine-learning parameter are stored in the storage space. In some examples, since the two versions of the machine-learning parameter are the same, the machine-learning parameter storage module 120 may not store the second version of the machine-learning parameter), and the machine-learning parameter storage module 120 transmits an event notification (including unmodified information) to the prediction data processing module 130.

In step S9, the prediction data processing module 130 receives the event notification and transmits a loading request to the machine-learning parameter storage module 120 according to the event notification.

In one embodiment, the prediction data processing module 130 can be informed by the received event notification that there are new (modified) machine-learning parameter in the data processing system 100 that can be operated on. Therefore, the prediction data processing module 130 transmits a loading request to the machine-learning parameter storage module 120.

In step S10, after receiving the loading request, the machine-learning parameter storage module 120 downloads the modified machine-learning parameter from the storage space corresponding to the storage parameter code.

In one embodiment, the machine-learning parameter storage module 120 transmits the modified machine-learning parameter to the prediction data processing module 130.

In step S11, the prediction data processing module 130 loads the modified machine-learning parameter.

In an embodiment, the prediction data processing module 130 can analyze or calculate new data through modified machine-learning parameter to obtain more accurate prediction results.

Based on the above description, by using the data processing system and data processing method, the prediction data processing module and the machine-learning parameter storage module can know the storage space corresponding to the machine-learning parameter by sharing the storage parameter code. After the machine-learning parameter is modified, through the mechanism of event notification, the prediction data processing module reloads the new or modified machine-learning parameter to update the machine-learning parameter used to predict the new data of machine-learning parameter. Even if the machine-learning parameter are updated frequently, the latest version of the machine-learning parameter can be automatically stored and loaded, so that the prediction data processing module uses the latest version of the machine-learning parameter in subsequent applications. Therefore, the data processing system and data processing method of the case can achieve the effect of simplifying the processing flow of machine-learning prediction.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A data processing system, comprising:
   a storage device, configured to provide a storage space;
   a machine-learning training module, configured to generate a machine-learning parameter and obtain a storage parameter code, wherein the storage parameter code corresponds to the storage space; and
   a machine-learning parameter storage module, configured to receive the machine-learning parameter and the storage parameter code, and store the machine-learning parameter in the storage space according to the storage parameter code; when the machine-learning parameter is modified, the machine-learning parameter storage module sends an event notification; and
   a prediction data processing module, configured to receive the event notification and transmit a loading request according to the event notification to request the modified machine-learning parameter from the machine-learning parameter storage module;
   wherein after receiving the loading request, the machine-learning parameter storage module downloads the modified machine-learning parameter from the storage space corresponding to the storage parameter code, and the machine-learning parameter storage module transmits the modified machine-learning parameter to the prediction data processing module.

2. The data processing system of claim 1, wherein the machine-learning training module is configured to receive a plurality of training data and input the training data into a neural network model to generate the machine-learning parameter.

3. The data processing system of claim 1, further comprising:
a parameter registration module, configured to receive the machine-learning parameter and generate the storage parameter code corresponding to the machine-learning parameter.

4. The data processing system of claim 2, wherein after the parameter registration module receives the machine-learning parameter, the parameter registration module transmits a space-planning request to trigger the machine-learning parameter storage module to arrange the storage space;
wherein after receiving the space-planning request, the machine-learning parameter storage module triggers a storage service to establish the storage space.

5. The data processing system of claim 2, wherein the parameter registration module generates a correspondence between the storage space and the storage parameter code, and transmits the storage parameter code to the machine-learning training module and the prediction data processing module.

6. The data processing system of claim 1, wherein the machine-learning parameter storage module calls an Application Programming Interface (API) of Kubernetes to request a Persistent Volume claim (PVC), and a Persistent Volume (PV) resource is dynamically deployed through the PVC, and the PV resource is used as the storage space.

7. A data processing method, comprising:
generating a machine-learning parameter and obtaining a storage parameter code, wherein the storage parameter code corresponds to a storage space;
receiving the machine-learning parameter and the storage parameter code, and storing the machine-learning parameter in the storage space according to the storage parameter code, and generating an event notification when the machine-learning parameter is modified; and
generating a loading request according to the event notification, and the loading request is used to request the modified machine-learning parameter;
wherein after the loading request is generated, the modified machine-learning parameter is downloaded from the storage space corresponding to the storage parameter code.

8. The data processing method of claim 7, further comprising:
receiving a plurality of training data and inputting the training data into a neural network model to generate the machine-learning parameter.

9. The data processing method of claim 7, further comprising:
receiving the machine-learning parameter, and generating the storage parameter code corresponding to the machine-learning parameter.

10. The data processing method of claim 9, further comprising:
after receiving the machine-learning parameter, a space-planning request is transmitted, and the space-planning request is used to request a storage service to establish the storage space.

* * * * *